H. H. BIGELOW.
HEEL PRESS.

No. 105,030.          Patented July 5, 1870.

Witnesses          Inventor

Thos. H. Dodge          Horace H. Bigelow
S. Emerson Haythan

H. H. BIGELOW.
HEEL PRESS.

No. 105,030. Patented July 5, 1870.

Witnesses,
Thos. H. Dodge
S. Emerson Harthan

Inventor
Horace H. Bigelow

H. H. BIGELOW.
HEEL PRESS.

No. 105,030.

Patented July 5, 1870.

Witnesses
Thos. H. Dodge
S. Emerson Haythorn

Inventor
Horace H. Bigelow

H. H. BIGELOW.
HEEL PRESS.

No. 105,030. Patented July 5, 1870.

Witnesses,
Thos. H. Dodge
S. Emerson Heathen

Inventor.
Horace H. Bigelow

United States Patent Office.

HORACE H. BIGELOW, OF WORCESTER, MASSACHUSETTS.

Letters Patent No. 105,030, dated July 5, 1870.

IMPROVED HEEL-PRESS.

The Schedule referred to in these Letters Patent and making part of the same.

*To all whom it may concern:*

Be it known that I, HORACE H. BIGELOW, of the city and county of Worcester, and Commonwealth of Massachusetts, have invented certain new and useful Improvements in Heel-Presses; and I do hereby declare that the following is a full, clear, and exact description of the same, reference being had to the accompanying drawing forming a part of this specification, in which—

Figure 1:
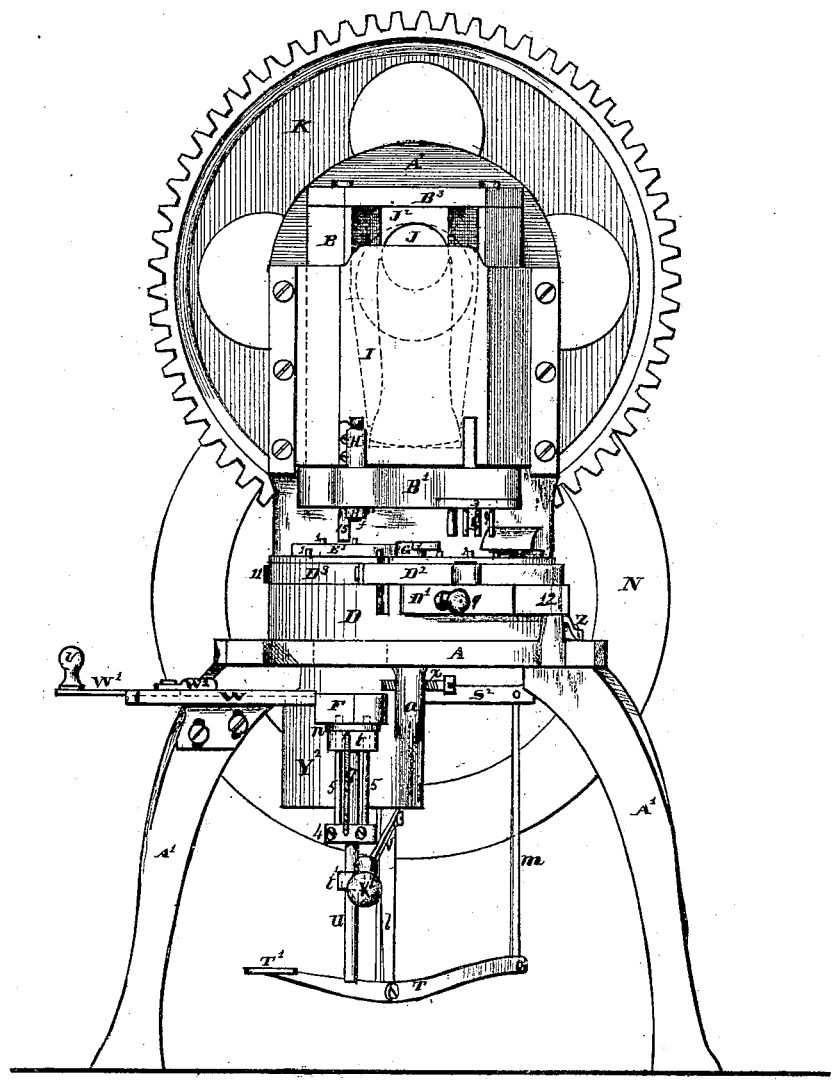
Figure 1 represents a front view of my improved heel-press.

My invention relates to certain improvements in machines for pressing and forming heels for boots and shoes, and for other purposes, as will be hereafter explained.

In the drawing, the part marked A is the bed or table of the machine, which is supported at a proper height upon legs $A^1$, and is provided with a strengthening flange, $a$, along its lower side, while from its upper side projects an upright frame, $A^2$, for supporting the stamping-plunger B and eccentric driving-shaft C.

Figures 3, 4, 5:
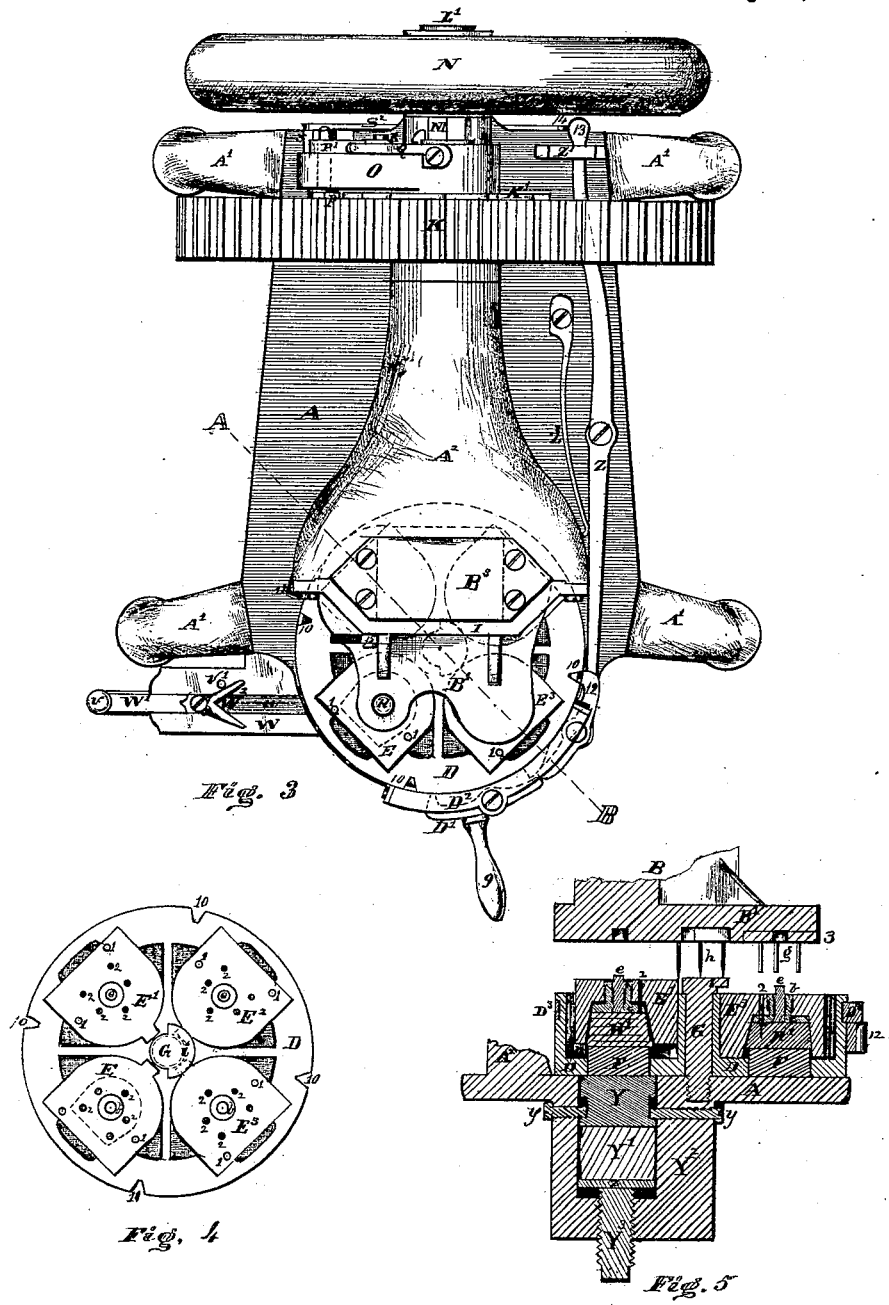
Figure 3 represents a plan view of the same.
Figure 4 represents a plan view of the die-cylinder and dies.
Figure 5 represents a vertical section through the dies and cylinder on lines A B, fig. 3.
Figure 13:
Figure 13 represents a plan view of one of the follower blocks.
Figure 10:
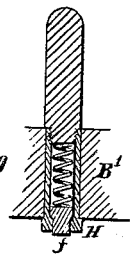
Figure 10 represents a central vertical section of the discharging-punch.

Upon the table A, at its forward end, and underneath the stamp $B^1$, is arranged, in a horizontal position, a revolving cylinder, D, which carries the forming-dies E $E^1$ $E^2$ $E^3$, said dies being disposed in the cylinder D, as indicated in figs. 3, 4, and 5.

The cylinder D is secured to the table A by means of a vertical pintle-bolt, G, which passes through the center of the cylinder D, and screws into the table A in such a manner that the cylinder is permitted to revolve freely around the pintle, but is allowed no vertical motion.

The dies E $E^1$ $E^2$ $E^3$ are nicely fitted into recesses formed in the upper part of the cylinder D, where they are held securely from all lateral motion, but may be moved vertically up and down by any pressure applied to them from below or above.

Openings are formed through the bottom of the cylinder D, directly beneath the centers of the dies; these openings are of such a form and size as will permit the passage of the heel-blanks O, and follower-blocks F, which latter are made in the shape of a heel, and of suitable sizes to fit the interior of the forming-dies.

Figure 8:
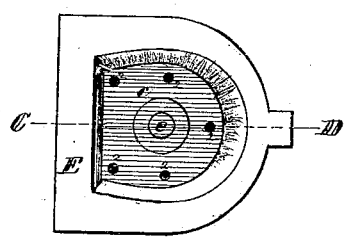
Figure 8 represents a bottom view of one of the heel-dies.

The dies E, for forming the heels, are made as shown in fig. 8, the matrix being of the form which is required to give the finished heel.

A head-plate, $c$, is arranged in the upper part of the matrix for forcing the pressed heel from the die. Said plate $c$ is secured upon the lower end of a sleeve, $b$, which extends up through an opening in the top of the die, and upon which the discharging-punch H strikes to depress the plate $c$.

A small flange is formed around the upper end of the sleeve $b$, which, in connection with a similar flange formed around the lower part of the opening in the die, prevents the plate $c$ from dropping out of the matrix.

In the center of the sleeve $b$ is hung a discharging pin, $e$, which is made somewhat longer than the sleeve $b$, and is furnished with suitable flanges, which prevent it from dropping entirely out of the sleeve, or being displaced during its upward motion, while it is permitted to work freely up and down, so that it will project at either the upper or lower end, as required.

The object of the pin $e$ is to release the heels from the head-plate $c$, after the latter has loosened them from the die, thereby insuring their discharge from the press.

The discharging-pin $e$ is actuated by means of a spring center, $f$, in the discharging punch H.

The tops of the dies and their head-plates are pierced with small vertical openings 2, through which the awls $h$ and drivers $g$ descend, and into which the nails for securing the heels are inserted.

In the present instance there are only five of these openings represented in each die, but any number may be formed therein, as desired, so that all the nails required in a heel can be driven at a single operation.

The head $i$ of the pintle bolt G is flanged at one side, and projects over the edge of the dies $E^2$ $E^3$, so as to prevent their being drawn up by the awls $h$ or drivers $g$ as they ascend.

The stamp $B^1$ consists of a flat plate, which is cast upon the lower end of the plunger B, and is made large enough to nearly cover all of the dies. Recesses are formed in its lower side to receive the head $i$ of the pintle-bolt G and pins c, as the stamp descends, so that its under surface can come down squarely upon the top of the cylinder D.

Recesses are also formed in the stamp B¹, above the dies E² and E³, into which are fitted and secured the plates 3, that hold the awls h and nail-drivers g, the former being arranged above die E², and the latter above die E³, in such a manner that they will descend into the openings 2, with the motion of the stamp B¹, while above the center of the die E is arranged the discharging-punch H, which descends upon the top of the pin e and sleeve b, and above the die E¹. The bottom of the stamp is made level, so that, in descending, it will strike squarely upon the whole top surface of said die, for the purpose of pressing the heel into proper form, as will be hereafter explained.

The plunger B, which carries the stamp B¹, is supported in a vertical position by suitable ways on the front of the upright frame A², to which it is held by the face-plate I, secured to the upright frame A² at each side, by screws or bolts, as shown the drawing.

The central part of the plunger B is recessed out to allow sufficient space for the eccentric J and rock-bar J¹, by means of which the spring B is operated.

The rock-bar J¹ has a bearing at its upper end upon the eccentric J, while its lower end, which is properly curved, rests upon a horizontal base, B², at the lowest part of the plunger B, and being closely fitted to the recess at its sides, it rocks back and forth with the action of the eccentric, thereby transmitting a very steady and powerful movement to the stamp B¹.

Figure 7:
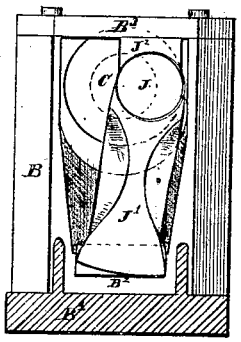
Figure 7 represents a front view of the operating eccentric and its connections with the plunger.

The bearing above the eccentric is formed by a pillow-block, J², inserted between the eccentric J and the top plate B³ of the plunger B, as shown in figs. 1 and 7 of the drawing.

Figure 6:
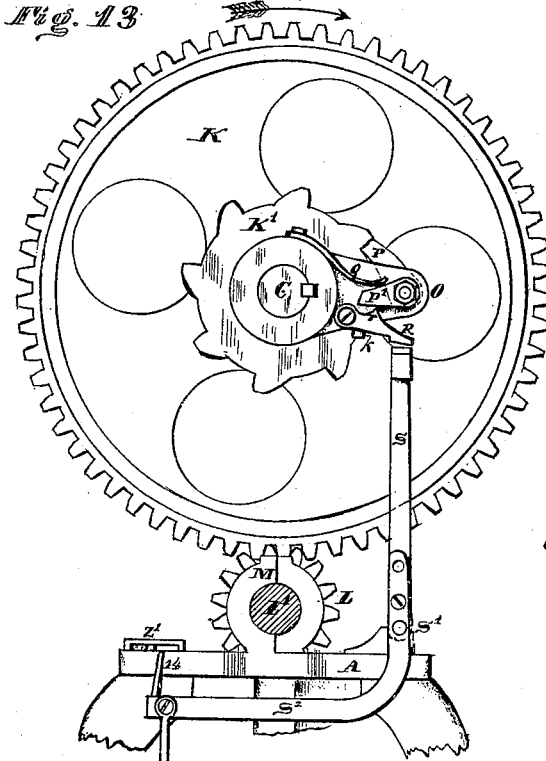
Figure 6 represents a rear view of the stop device.
Figure 9:
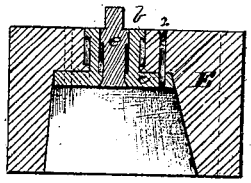
Figure 9 represents a central vertical section of one of the heel-dies, on line C D, fig. 8.

The shaft C is operated by means of a gear, K, and pinion L, in connection with the stopping devices shown in figs. 3 and 6.

The pinion L is fixed upon the main shaft L¹, which shaft is arranged parallel to and beneath the shaft C. It is supported in bearings M on the upright frame A² and table A, and it is provided with a heavy balance-wheel, N, for equalizing its motion.

The motive power is to be applied to the main shaft L¹, by means of any suitable arrangement of belts or gears, which it is not necessary to herein illustrate.

The gear K, which meshes with the pinion L, is hung loosely upon the shaft C, and has secured firmly to one of its sides a ratchet-wheel, K¹, the teeth of which incline forward in the direction of its motion, as indicated in fig. 6.

Keyed to the end of the shaft C, outside of the ratchet-wheel K¹, there is an arm, O, through the outer end of which is arranged, in a direction parallel with the axis of shaft C, a small spindle, which has secured to one of its ends a ratchet-dog, P, that engages with the ratchet-wheel K¹, and at its other end a trip-lever, P′, by means of which the ratchet-dog P is operated.

A spring, Q, is secured to one side of the arm O, which presses upon the trip-lever P′, and tends to throw the dog P into clutch with the teeth of the ratchet-wheel K¹.

The dog P is thrown out of clutch with the ratchet K¹ by the action of a stop-finger, R, upon the trip-lever P′.

One end of the stop-finger R is pivoted to the side of the arm O, as indicated in fig. 6, while its other end is arranged to strike upon the top of the swinging stud S, which is hinged to and projects upward from the bed or table A.

The finger R is provided with a projection, r, that rests against the trip-lever P′, and presses it upward, when the finger R strikes the stud S, thereby throwing out the dog P.

When the pressure is removed from the finger R the trip-lever P′ and finger are pressed down by the spring Q.

A guard-pin, k, is arranged beneath the finger R to prevent it from swinging too far downward.

The swing-stud S is hinged upon the bed or table A, as shown at S¹, and is swung back and forth by the bell-crank lever S², one end of which is rigidly secured to the side of the stud S, while its other end is connected, by means of a rod, m, to the rear end of a treadle, T, which latter is fulcrumed near its center to a hanging support, l, beneath the table A, and is provided at its front end with a foot-pad, T¹, upon which the operator places his foot when he desires to set the plunger B in motion.

A spring, T², is attached to the treadle-lever T, to raise its forward end when the pressure of the foot is removed.

An opening of sufficient size to allow the passage of the follower-blocks F is formed through the table A, directly beneath the die E, as indicated in dotted lines in fig. 3, under which is arranged a feeding device, by means of which the heels are transferred to and from the dies.

This device consists of a vertical elevating spindle, U, having at its upper end a circular disk, n, for supporting the follower-blocks F during the operation of changing the heels.

The spindle U slides up and down in bearings t t′, it being raised and depressed by the hand-lever V, the rear end of which is pivoted beneath the table A, and its front end provided with a suitable handle, V′.

A slide, 4, is arranged upon the spindle U, wherein are secured the lower ends of a pair of stay-pins, 5, which pass up through the bearing t and disk n into holes 6, formed in the lower side of the follower-blocks F, and thereby retain said blocks in position upon the disk n.

The slide 4 is drawn upward by a spring, 7, one end of which is secured to the slide, and the other to the disk n.

The arrangement of the slide 4 is such that, when the spindle U is elevated to pass the heel and follower into the die, the slide 4 strikes the bearing t, and thereby withdraws the ends of the pins 5 from the holes 6 in the follower-block F, thereby releasing it from the disk n, so that it may be carried forward with the die as the cylinder D is revolved.

At the left of the elevating spindle U, and secured to one of the supporting standards A¹, is the receiving table W, and entering slide W¹, by means of which the heel-blanks are carried to the elevating device.

A dovetailed groove, w, is formed across the top of the table W, in which the entering slide W¹ moves back and forth; said slide is provided with a fork, W², for holding the heel-blank in the proper position, and with a knob or handle, v, by means of which it is moved back and forth along the groove w.

A stud, v′, is set in the top of the table W, which the fork W² strikes, and prevents the slide W¹ from being drawn too far back.

The table W may be adjusted up or down, and it is set so that its top surface will be slightly above the top surface of the follower-block F upon the disk n.

A gauge-screw, x, is arranged through the flange a opposite the slide W¹, against which the heel-blanks are stopped; said screw can be moved in or out to accommodate the different sizes of heels.

A vertical groove, 8, is formed in the side of each follower-block F, to allow them to pass the end of the screw x.

Beneath the die E¹ is arranged a device for relieving the machine from injurious concussion while pressing the heels into form. It consists of a movable metallic bed-piece, Y, somewhat larger than the bottom of the follower-blocks F, set into the table A, as indicated in fig. 5.

A spring, $Y^1$, of rubber or some other suitable material, is arranged beneath, and supports the bed-piece Y, which latter is held by screws $y$ in such a manner that its upper surface will not rise above the upper surface of the table A, while it can at any time be depressed by any extra amount of pressure above that required in forming the heels.

The bed-piece Y and spring $Y^1$ are inclosed by a cylinder, $Y^2$, cast upon the under side of the table, and through the bottom of said cylinder is arranged an adjusting-screw, $Y^3$, by means of which the spring $Y^1$ can be adjusted to withstand any desired amount of pressure.

A guard-plate, $z$, is inserted between the spring $Y^1$ and screw $Y^3$, as indicated.

The devices for revolving the die-cylinder D consists of a latch-dog, $D^1$, provided with a handle, 9, and pivoted near its center to the lower side of a curved bar, $D^2$, which latter is secured to the cylinder D by means of a metallic band, $D^3$.

The band $D^3$ is fitted into a groove formed around the upper part of the cylinder D, in such a manner that the curved bar $D^2$ and latch-dog $D^1$ can, by pressing upon the handle 9, be moved freely around to the right without moving the cylinder D, but by pressing the handle 9 to the left, the point of the dog $D^1$ catches into one of the notches 10 formed in the periphery of cylinder D, whereby said cylinder is caused to revolve, carrying forward the dies. The number of notches in the periphery of the cylinder corresponds with the number of dies, of which, in the present instance, there are four, but the machine may be constructed with a greater or lesser number of dies, if desired.

The revolving device is arranged in such a manner that it will advance the cylinder D by one-quarter revolution at each full sweep, to the left of the handle 9.

An elastic pad or stop-lug, 11, is secured to the upright frame $A^2$, against which the end of the curved bar $D^2$ strikes when the dies are in proper position, and thereby stops any further motion of the cylinder, until the handle 9 and dog $D^1$ have been swung to the right, and the hold of the latter is renewed.

At the right of the cylinder D, pivoted upon a projecting portion of the table A, is a stop-dog, 12, for holding the cylinder and dies in position during the descent of the stamp $B^1$.

Figure 2:
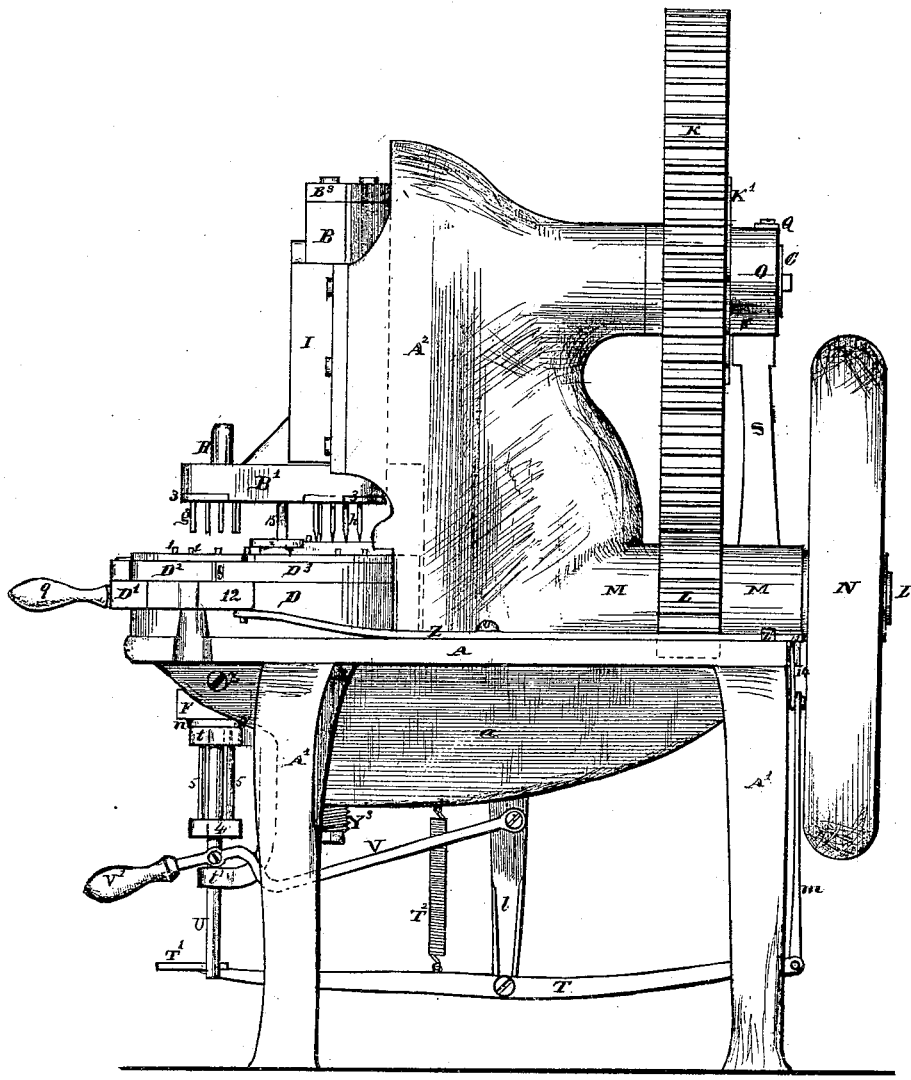
Figure 2 represents a side view of the same.

A guard-lever, Z, which acts in connection with the stop-dog 12, is fulcrumed near its center to the table A, as indicated in figs. 2 and 3.

The forward end of lever Z works on a pin fixed in the head of the stop-dog 12, while its rear end is passed under a loop, $Z^1$, and furnished with a small disk, 13, as shown.

A spring, $Z^2$, secured to the table A, presses against the forward end of the lever Z, and tends to throw the head of the stop-dog 12 out from the notch 10 in the side of the cylinder D, and an inclined lug is fixed to the under side of the curved bar $D^2$, which runs under the shank of stop-dog 12, when the bar $D^2$ is swung hard up to the right, (see dotted lines, fig. 3,) and thereby forces the head of dog 12 into the notch 10 to hold the cylinder in position; the same operation also swings the rear end of lever Z outward from above the spur 14 on the end of lever $S^2$, so that said lever can be raised by means of the treadle T.

By the use of the lever Z, in connection with the dog 12, any accident which might happen from the dies becoming misplaced, or the premature starting of the plunger, is prevented, as it is impossible to swing back the stud S and let the ratchet-dog P into gear with the wheel $K^2$, excepting when the head of dog 12 is in one of the notches 10, at which time the dies are of necessity in proper position. And, again, if the dog 12 is but partially entered in the notch 10, when the treadle T is operated, the spur 14 will force the rear end of lever Z outward, and, thereby press the head of the dog 12 properly into the notch 10.

A guard, 15, is attached to the front of the machine above the cylinder D, to prevent the die from receiving more than one heel at a time. The guard 15 is adjusted at a short distance above the cylinder, and should a second heel accidentally be placed in the die before the first is discharged therefrom, or a heel become misplaced while entering the die, the top of the die E will be raised so high that it will strike the guard 15, and prevent the revolution of the cylinder, until the cause of difficulty is removed.

Figure 11:
Figure 11 represents a side view of the nail-holder.
Figure 12:
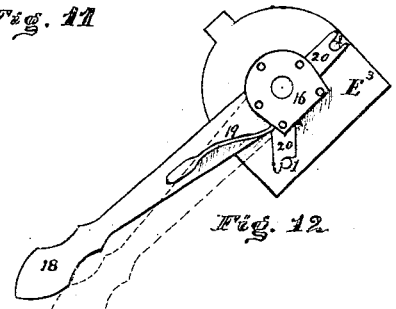
Figure 12 represents a plan view of the nail-holder, showing the manner in which it is placed upon the die.

The nails to be driven into the heels are fed into the machine by means of a nail-holder, such as represented in figs. 11 and 12 of the drawing.

It consists of a head-block, 16, pierced with holes to correspond with the holes 2 in the dies. The block 16 is of sufficient thickness to support the nails in an upright position, and it is pivoted through its center to a thin bottom plate, 17, also pierced with holes in a like manner.

At one side, the bottom plate is extended outward to form the handle 18, and a spring, 19, is arranged thereon, which throws the plate 17 to one side, so that the holes in the plate 17 and head-block 16 will be out of line with each other.

Arms 20 are formed on the head-block 16, in the ends of which are formed depressions, which fit onto the studs 1 set in the top of the dies.

The nails 21 are set into the holes in the head-block 16, as shown in fig. 11; the holder is then placed upon the top of the die $E^3$ in the manner shown in fig. 12, the depressions in arm 20 fitting the studs 1, which brings the holes in the head 16 directly over the holes in the die.

The operator then swings the handle 18 to one side, to the position indicated by dotted lines, fig. 12, which brings the holes in the bottom plate, 17, in line with the holes in the head-block, 16, thus allowing the nails, 21, to drop through into the holes, 2, of the die, so that the drivers, $g$, force them into the heels as the stamp descends.

The operation of forming the heels is as follows:

The pieces of which the heels are composed are tacked together, and secured to each other sufficiently to hold them in place. One of the blanks thus formed is placed upon the receiving-table W, in front of the fork $W^2$, and the operator, taking hold of the handle V, runs in the slide $W^1$ until the heel strikes the end of the screw $x$, when he draws out the slide, leaving the heel upon the follower-block F. The elevating spindle U is then raised, by means of the lever V, and the heel-blank and follower-block F is thereby elevated to the interior of the die E, which die is, by the operation, slightly raised, so that its upper part will project from the top of the cylinder D. The operator then takes hold of the handle 9 and revolves the cylinder to the left, so as to bring the die to the position marked $E^1$. He then swings the handle back to the right, which forces in dog 12, to hold the cylinder in position. He then places his foot upon the foot-pad T, and presses down the treadle-lever $T^1$, which swings back the stud S, and allows the dog P to engage the ratchet-wheel K, which operates the eccentric and moves down the plunger B, bringing the stamp $B^1$ down upon the die $E^1$, and forcing it down upon the follower-block F, thereby compressing the heel-blank $H^1$ firmly into the matrix against the head-plate $c$.

When the shaft C has made its revolution the stop-finger R strikes upon the end of the stud S and raises the trip-lever P', thereby swinging back the dog P, and stopping further motion of the shaft C and plunger B.

The cylinder is then revolved again, which brings the die to the position marked E², when the plunger B, being again started, the awls h are forced down through the openings 2 and perforate the heel.

After the heel has been perforated the cylinder is revolved to bring the die to the position marked E³, when the operator places the nail-holder containing the nails over the die, and drops the nails into the openings, in the manner before explained. After removing the nail-holder the plunger B is again started, and the drivers g descend into the openings 2 and force the nails into the perforations formed by the awls h.

The cylinder is again revolved, which carries the die to the position from whence it started, and, as the plunger descends, the discharging punch presses down the head-plate c and discharging-pin e, thereby forcing the completed heel from the die, which, together with the follower-block F, drops down upon the disk n, and is removed from thence by the hand of the operator, the operation being completed.

It will be understood that after the dies are filled, a finished heel is removed and a fresh blank is inserted as each die passes the position marked E, so that, although it requires four operations to complete the heels, by using four dies, all of said operations are accomplished at each stroke of the plunger B and stamp B¹, thereby forming the heels very rapidly.

It will be observed that the perforations are formed and the nails driven while the heels are under pressure from all sides, whereby the leather of the different layers of which the heels are composed, is kept from unduly expanding after the pressure has been removed, and also that the uneven edges of the lifting are pressed inward, thereby forcing all of the stock into the heel, so that there is no waste from trimming, the edges being left firm and smooth, and of the proper form, whereby they only require to be finished up, while the heels, being firmer and more solid, will wear much longer than heels made in the ordinary way.

Different sizes of dies and follower-blocks are made for the different sizes and forms of heels, and heels of different thicknesses may be made by varying the thickness of the follower-blocks F or head-plates c, while, by changing the length of the driver g, the nails may be driven into the heels to a greater or lesser extent.

In lieu of supporting the forming-dies in a revolving cylinder, they may be arranged in a sliding-support, and move back and forth under the stamp B¹, or a single die may be used separately, but I prefer to use them in the manner shown.

It will be understood that, by my improved press, all of the nails may be partially driven, to be subsequently driven the remaining portion of their length by another machine, which secures them to the boots or shoes, or, if preferred, only a few of the nails may be driven, all of the holes being formed to receive the nails as the heels are used.

Having described my improved heel-press,

What I claim therein as new and of my invention, and desire to secure by Letters Patent, is—

1. The combination of the follower F with the die E, substantially as and for the purposes set forth.

2. The combination with the forming-die of the head-plate c, substantially as and for the purposes set forth.

3. The combination, with the head-plate c and sleeve b, of the discharging-pin e, substantially as and for the purposes set forth.

4. The combination, with the sleeve b and discharging-pin e, of the discharging-punch H, provided with a spring center, f, substantially as and for the purposes set forth.

5. The combination, with discharging-pin e, of the spring center f, substantially as and for the purposes set forth.

6. The combination, in a machine for forming pressed heels for boots and shoes, of the following elements, viz: a die for pressing the heel into proper form, provided with holes for the passage of the heel-perforating awls, nails, and nail-drivers, a series of perforating awls, and a series of nail-drivers, substantially as and for the purposes set forth.

7. The combination, with die E, and follower-block F, of the elevating disk n, substantially as and for the purposes set forth.

8. The combination, with the disk n and bearing t, of the slide 4, and pins 5, substantially as and for the purposes set forth.

9. The combination, with the disk n, and receiving-table W, of the slide W¹, and fork W², substantially as and for the purposes set forth.

10. The combination, with the disk n and follower-block F, of the screw x and fork W², substantially as and for the purposes set forth.

11. The combination, with the fork W², of the stop-pin or stud r, substantially as shown and described.

12. The combination, with the bed or table A, and cylinder D, of a forming-die E, and follower-block F, substantially as and for the purposes herein set forth.

13. The flanged head i on the pintle-bolt G, substantially as and for the purposes set forth.

14. The combination, with the cylinder D, of the stop dog 12 and the mechanism for rotating the cylinder, substantially as shown and for the purposes set forth.

15. The combination, with the table A and cylindrical receptacle Y², of the bed-piece Y, spring Y¹, plate Z, and adjusting-screw Y³, substantially as and for the purposes set forth.

16. The combination of the stop-dog 12, the bell-crank lever S², the guard-lever Z, and the spur 14, substantially as described.

17. The combination, with the ratchet-wheel K¹, arm O, and swinging-stud S, of the dog P, trip-lever P', spring Q, finger R, and guard-pin k, substantially as and for the purposes set forth.

18. The nail-holding device, composed of the parts 16, 17, 18, 19, and 20, substantially as shown and described.

19. The combination of the arms 20 of the nail-holder, with the studs 1 on the forming-dies, substantially as shown and for the purposes stated.

20. A machine for forming compressed heels for boots and shoes, the mechanism of which is constructed and arranged substantially as described, so that the heel is compressed on all sides, and held under continued pressure during the operation of perforating the heel and driving the nails, for the purposes set forth.

HORACE H. BIGELOW.

Witnesses:
 THOS. H. DODGE,
 S. EMERSON HARTHAN.